C. E. HILTON.
ATTACHMENT FOR HAY STACKERS.
APPLICATION FILED FEB. 23, 1921.
1,420,548.
Patented June 20, 1922.
2 SHEETS—SHEET 2.
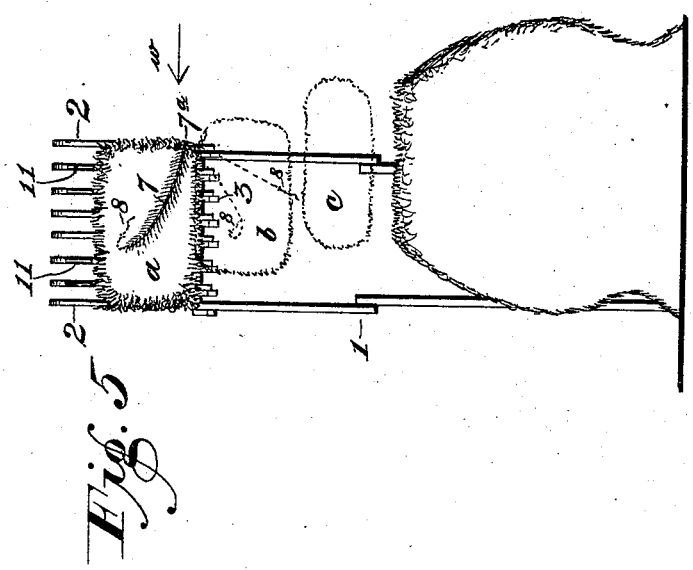
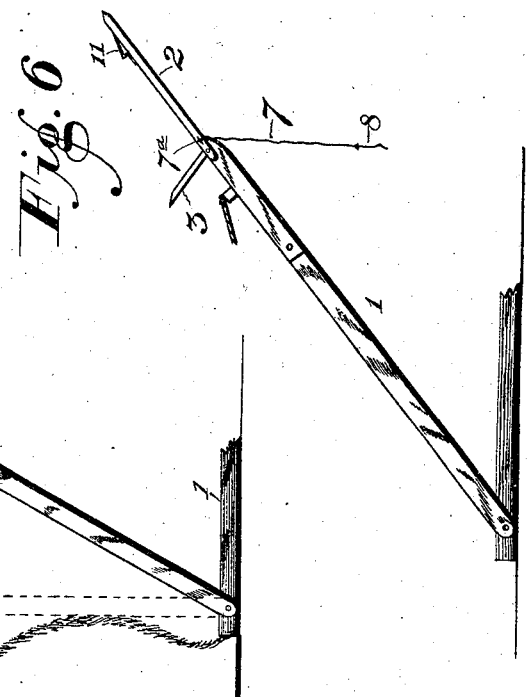
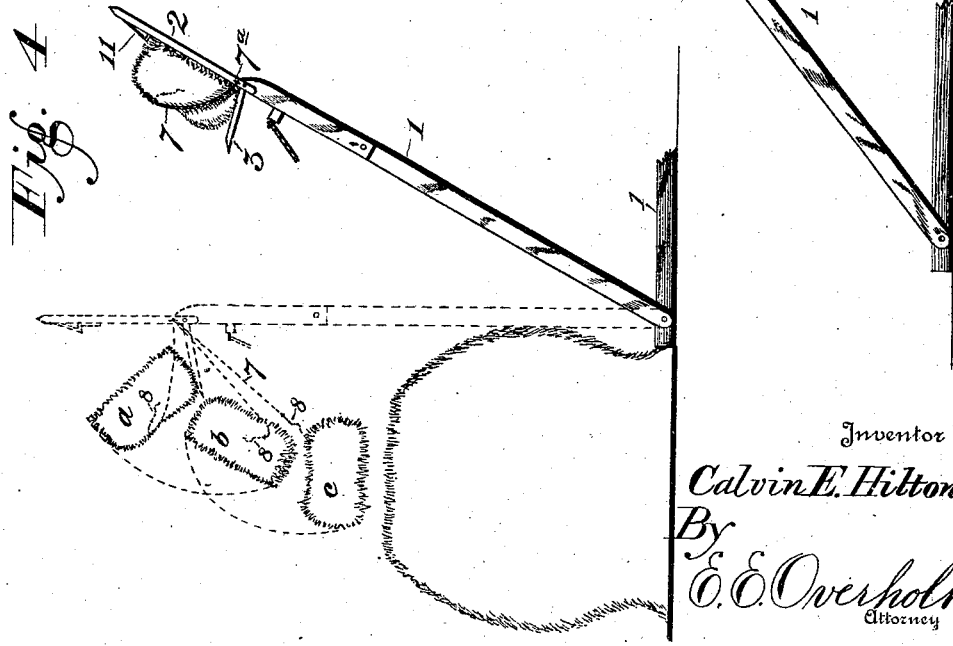
Inventor
Calvin E. Hilton
By
E. E. Overholt
Attorney

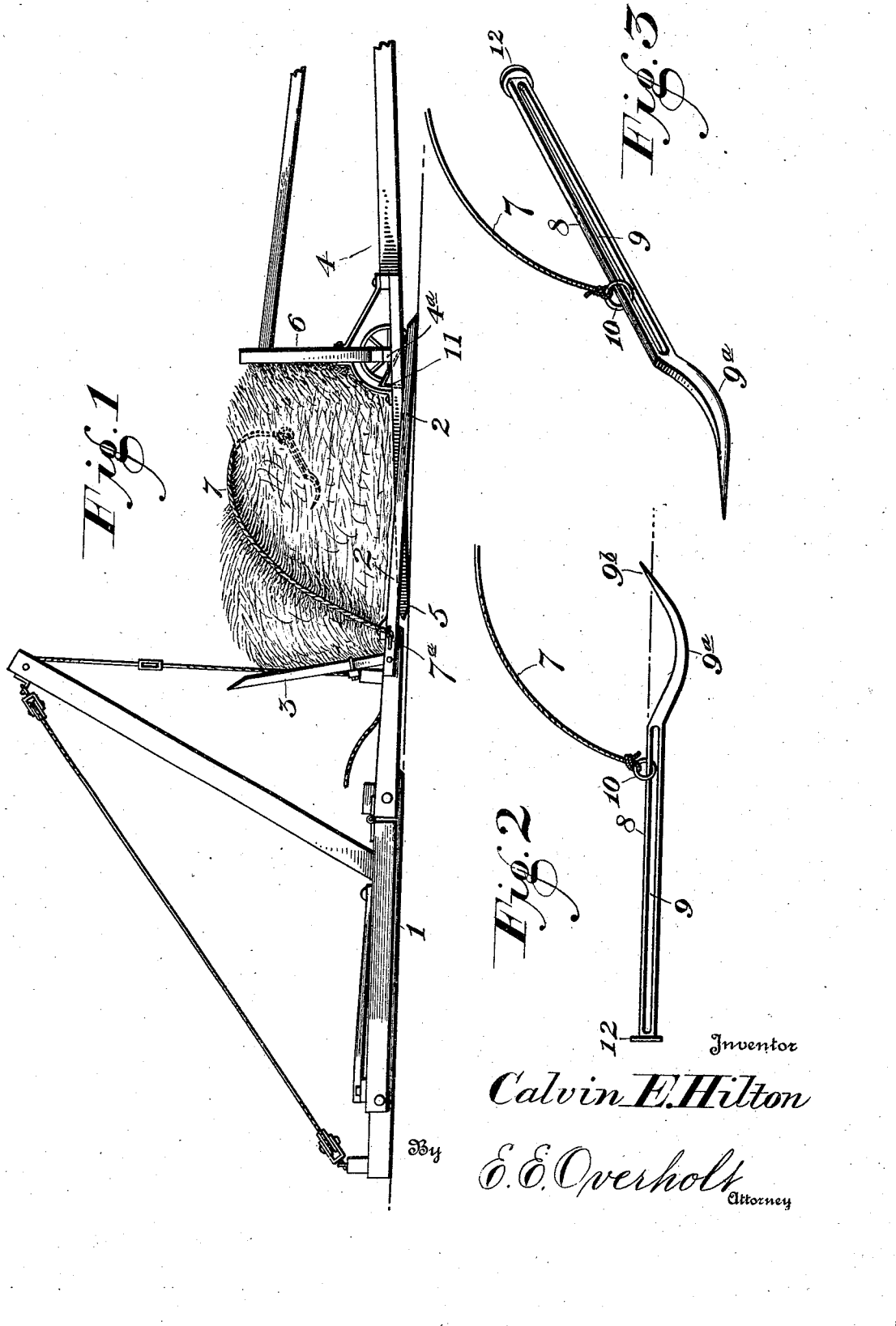

UNITED STATES PATENT OFFICE.

CALVIN E. HILTON, OF WITTEN, SOUTH DAKOTA.

ATTACHMENT FOR HAY STACKERS.

1,420,548.  Specification of Letters Patent.  Patented June 20, 1922.

Application filed February 23, 1921. Serial No. 447,258.

*To all whom it may concern:*

Be it known that I, CALVIN E. HILTON, a citizen of the United States, residing at Witten, in the county of Tripp and State of South Dakota, have invented certain new and useful Improvements in Attachments for Hay Stackers, of which the following is a specification.

My invention relates to attachments for hay stackers.

My object is to provide simple and inexpensive means, which operate first, to engage the load of hay (brought up by the hay sweep and deposited on the platform teeth of the pitcher fork), and hold all of said hay on said platform teeth, so that when the team is backed away, neither the natural expansion of the hay nor the friction of the sweep rake teeth as they are withdrawn from under the hay, will occasion any of the hay to slip over the ends of said teeth onto the ground, where it will have to be pitched back onto the pitcher platform by hand before the load of hay is lifted to the stack. Secondly, to releasably hold the load of hay on the pitcher fork in such a way that it will be deposited at the desired point on the stack, and will not be carried over the top of the stack by momentum from fast driving, nor blown over by high winds.

A specific object is to provide means for engaging the load of hay (just brought up by the sweep rake and deposited on the pitcher platform) while said hay is still compressed between the pitcher head teeth and the hay guard rails of the sweep, and partially binding said hay to the pitcher fork by means adapted to follow the hay to a predetermined distance from the stack when it is dumped from the pitcher head, and to then become disengaged from it, said means comprising a flexible member secured at one end to the pitcher fork, preferably at one side thereof, and a releasable hay engaging member at the other end of said flexible member.

Other objects will appear in the subjoined description.

An important feature of the invention consists of a hay needle having a curved portion at its pointed end and a comparatively long slot or eye extending rearwardly from said curved portion to the other end of the needle, with a ring adapted to move back and forth in said elongated eye, and a flexible connection secured at one end to said ring and at its other end to one of the outer teeth of the pitcher platform preferably near the pitcher head.

The invention consists in certain novel features of construction and arrangement of parts as will be hereinafter described and claimed, reference being had to the accompanying drawings in which:—

Fig. 1 shows in side elevation a stacker with a load of hay just delivered upon the pitcher platform thereof by a hay sweep, and secured on said platform by my improvement. Fig. 2 shows my improved hay needle in side elevation. Fig. 3 is a perspective view thereof. Figs. 4 and 5 are views largely diagrammatic showing the movements of the hay after it has been dumped from the pitcher fork; and, Fig. 6 illustrates the position assumed by my improvement as the pitcher fork returns to the ground after having delivered a load of hay on the stack.

The numeral 1 indicates the stacker which is provided with a pitcher fork of common construction having a series of teeth 2 forming the platform thereof and another series 3 forming the head thereof; while the numeral 4 indicates a hay sweep having the platform teeth 5, and a hay guard rail 6.

A flexible member 7 is secured at one of its ends to either one of the outer teeth of the pitcher platform, preferably back near the pitcher head, as at 7ª, and at its other end is secured to the hay needle 8; said needle having a long slot or eye 9 into which is received a ring 10 adapted to move freely back and forth therein, and to which ring the flexible member 7 is secured.

The portion 9ª of the needle between the forward end of the eye and the point of the needle is curved downwardly and upwardly for a reason that will presently appear, and the pointed end 9ᵇ of this curved portion extends upwardly a little above the plane of the top of the needle, as clearly indicated in Fig. 2. The needle is preferably provided with a head 12 which forms a stop for it when it has been thrust into the hay its full length.

Certain of the teeth of the pitcher platform are provided near their forward ends with brackets 11 rigidly secured thereto; one purpose of these brackets being to prevent the hay from slipping off over the ends of the platform teeth 2 when the hay sweep teeth 5 are withdrawn from under the load of hay on the pitcher platform.

I usually employ four of these brackets placing them on the second and third teeth from each outside tooth of the pitcher fork, as indicated in Fig. 5; but the number of brackets may be varied, of course, if the nature of the hay to be handled requires it.

The operation of my improvement is as follows:—

The load of hay is brought up on the sweep 4 in the ordinary way and deposited on the pitcher platform, as illustrated in Fig. 1. When the axle $4^a$ of the sweep strikes the brackets 11 and begins to slide up thereon, the increased resistance offered by the incline of the bracket to the forward movement of the sweep will cause the horses to stop (just at the right place), much the same as if they had run against a solid obstruction. The stopping of the horses at this point also prevents the hay sweep teeth from running into the fork head and getting broken, as they often do with the ordinary arrangement. The elevation of the axle of the sweep, as it slides up the brackets 11 causes the forward ends of the sweep teeth 5 to point downwardly into engagement with the ground, which adds to the resistance offered by the brackets to arrest the forward movement of the sweep at the proper place, while at the same time turning the points of the sweep teeth down, so that even if a fractious team should thrust the sweep too far inwardly, the points of the teeth would go under the fork head and not into it to be broken.

These brackets also serve the splendid purpose of preventing any of the hay from slipping off over the ends of the teeth from the expansion of the hay or the friction of the sweep teeth 5 as they are withdrawn from under the hay.

While the load of hay is still pressed between the hay guard rail 6 of the sweep and the fork head 3, as illustrated in Fig. 1, the rope 7 of my improvement is drawn preferably diagonally across the bunch of hay, and the needle is held in a vertical position with its curved end facing toward the rope; the curved portion of the needle is then thrust down vertically into the hay up to the eye with the ring 10 at the lower end of said eye; the upper end of the needle is then forced backwardly and thrust horizontally into the hay preferably underneath the rope toward the end $7^a$ thereof. As the needle is thrust into the hay, the ring 10 slips backwardly in the slot or eye 9, thus leaving the rope always as tight as it was in the beginning of the operation. The hay is then ready to be elevated to the stack. When the hay is first dumped from the pitcher fork it assumes somewhat the position illustrated diagrammatically at $a$ in Fig. 4. When in this position, the pull of the rope 7 occasioned by the movement of the hay from the platform teeth 2 will tend to draw the ring 10 down the eye 9 toward the pointed end of the needle, but will have little or no tendency to withdraw the needle from the hay; so that however forcibly the bunch of hay may be pitched forwardly from the fork head by fast driving or by high winds coming from the rear, the rope will not permit it to go on out, as it otherwise would do, and over the top of the stack, but will forcibly resist too great an outward movement, thus proving a great convenience in topping out stacks, when fast driving or high winds are almost sure to carry the hay over the top: and since the needle is preferably inserted at the forward side of the bunch of hay, that side which was tossed farthest out at the beginning will be drawn inwardly to the position illustrated at $b$, at which point the continued pull of the rope on the needle, (occasioned by the descending movement of the hay), will cause the bunch of hay when in the position $b$ to make a further somewhat semicircular movement bringing the same to the position indicated at $c$, at which point the pull on the needle will now be on the outer end thereof, so that the needle will now be withdrawn from the hay, the curved portion of the needle still serving as it is withdrawn to give a final pull upon the bunch of hay to overcome any remaining tendency it may have to go too far forward, thus causing the hay to drop at the desired point on the stack.

The needle, of course, would work well if it were straight, and also if it were thrust into the hay in different directions from that described, as it would still pin the bunch of hay nicely down upon the fork of the pitcher and cause it all to go up onto the stack, but the curved end of the needle makes it easy, after first thrusting the needle down vertically to the desired depth in the hay, to then bring it to an approximately horizontal position.

While Fig. 4 of the drawings as just described, shows in a diagrammatic way how the evil effects of fast driving and high winds from the rear are overcome, Fig. 5 similarly illustrates how the evil effects of high side winds may be overcome by attaching the rope 7 to whichever side of the fork-head happens to be next the wind. In the illustration the wind is supposed to be blowing from the right as indicated by the arrow $w$. It will be seen from this figure that as the bunch of hay successively reaches the positions $a$, $b$, and $c$, as already described in connection with Fig. 4, the rope and needle act in substantially the same way to resist side winds as they do to resist wind from the rear. If the wind is coming in the opposite direction from that indicated by the arrow $w$ (that is, from the left instead of from the right), then the rope 7 is simply fastened to the left side of the fork head instead of to the right as shown.

When the hay fork is returning to the ground for another load of hay, the rope and needle simply hang down at the side of the sweep out of the way and reach the ground first.

Thus it will be seen that I have provided a most practical, economical, and serviceable device which is so constructed that it follows the hay from the fork down toward the stack and controls it in its descent, in spite of fast driving and adverse winds, only entirely releasing it when it is sufficiently near the stack to fall at the desired point thereon.

When the needle is thrust into the hay horizontally under the rope the curved portion 9ª carries the point of the needle up in which position the needle securely holds the rope tight across the top of the bunch of hay, in such a way that the pull of the rope on the ring 10 has little or no tendency to release the needle from the hay as the same is elevated to the stack.

The device while doing its work in a most satisfactory manner saves the labor of one man, and permits stacking to be done in a high wind when it would otherwise be impossible to do stacking at all.

It is apparent from the construction of my device that it will work well with any overshot stacker, and is not limited to any one particular make.

Having now described my invention, what I claim as new and desire to protect by Letters Patent is:—

1. The combination with a hay pitcher of a needle having a comparatively short portion at one end curved downwardly below the plane of the shank of the needle and then upwardly, terminating in a point; and an elongated eye extending rearwardly from said curved portion to the other end of the needle.

2. The combination with a hay pitcher, of a needle having a portion at one end curved downwardly below the plane of the shank of the needle and then upwardly, terminating in a point, said point being above the plane of the shank of the needle; and an elongated slot extending rearwardly from said curved portion to the other end of the needle.

3. The combination with a hay pitcher, of a needle having at one end a portion curved downwardly below the plane of the shank of the needle and then upwardly and tapered to a point with the point projecting above the plane of the shank of the needle; and an elongated eye in the shank of the needle.

4. In a device of the character described, a needle having a tapered portion at one end and an elongated slot extending rearwardly therefrom; and a securing member mounted in said slot to move back and forth therein.

5. In a device of the character described, a needle having a comparatively short portion at one end curved downwardly and then upwardly, and an elongated eye extending rearwardly from said curved portion to the other end of the needle in a plane at right angles to the plane of the curved portion of the needle; and a securing member mounted on said slot to play back and forth therein.

6. The combination with a hay pitcher of a needle having a tapered portion at one end and a head at the other end, said head lying in a plane at right angles to the longitudinal extent of the needle; and an elongated slot extending through the needle between said portions.

7. An attachment for stacker forks, comprising a needle tapered at one end and having an elongated eye extending rearwardly from said tapered portion to the other end of the needle; a securing member mounted to move back and forth in said slot; and a flexible member attached at one end to said securing member, and adapted to be attached at its other end to the hay fork.

8. An attachment for the pitcher fork of a stacker, comprising a needle having a tapered portion adapted to penetrate the hay; a securing member movable longitudinally back and forth on the other portion of the needle, said latter portion of the needle being provided with means for limiting the longitudinal movement of the securing member thereupon; and a flexible member connected at one end to said securing member and designed to be connected at its other end to the stacker fork.

9. In a device of the character described, a flexible member for attachment at one end to the pitcher fork; a hay-engaging member having a portion at one end adapted to penetrate the hay, and having another portion adapted for slidable engagement with the other end of the flexible member to permit the flexible member to move back and forth thereupon, said latter portion of the needle having means for limiting the back and forth movement of the flexible member thereupon.

10. The combination with a pitcher fork of means for holding hay thereon, comprising a flexible connection secured at one end to the fork and adapted to be passed over the bunch of hay to hold the same together on the fork, said flexible member being provided at its other end with means for detachable engagement with the hay, whereby to provide an anchor in the hay for securing the one end of the flexible connection thereto.

11. The combination with a pitcher fork, of means for holding hay thereon, comprising brackets mounted toward the forward ends of the platform teeth to prevent the hay from slipping over the ends of said teeth; a flexible connection secured at one end to the fork and adapted to be passed over the bunch of hay to hold the same together on the fork; and a hay needle secured to the other end of the flexible connection and adapted to be passed into the hay to further bind the same together and to form an anchor in the hay for the end of said flexible member.

In testimony whereof I affix my signature.

CALVIN E. HILTON.